(No Model.)
L. H. BARKER.
PHOTOMETER AND ACTINOMETER.
No. 464,059. Patented Dec. 1, 1891.
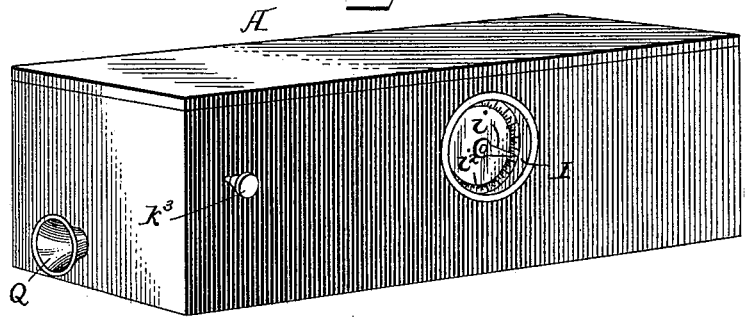
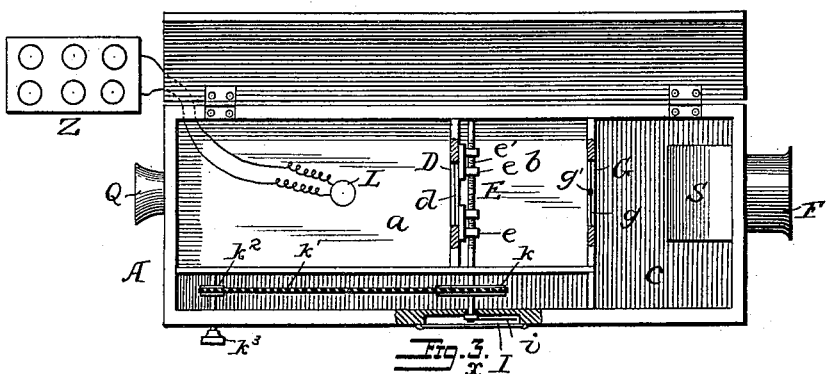
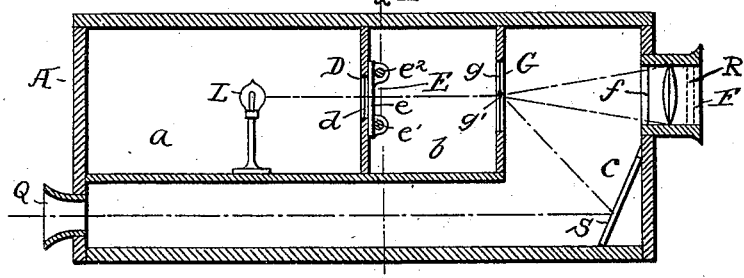
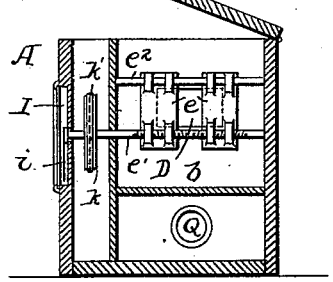
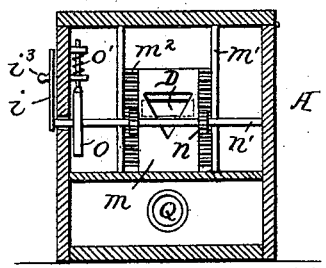
WITNESSES
Jno. G. Hinkel
Will E. Neff
INVENTOR
Louis H. Barker
by J. A. Watson
Attorney

UNITED STATES PATENT OFFICE.

LOUIS H. BARKER, OF WILLIAMSPORT, PENNSYLVANIA.

PHOTOMETER AND ACTINOMETER.

SPECIFICATION forming part of Letters Patent No. 464,059, dated December 1, 1891.

Application filed July 20, 1891. Serial No. 400,020. (No model.)

*To all whom it may concern:*

Be it known that I, LOUIS H. BARKER, a citizen of the United States, residing at Williamsport, in the county of Lycoming and State of Pennsylvania, have invented certain new and useful Improvements in Photometers and Actinometers, of which the following is a specification.

My invention relates to a photometer and actinometer; and it consists in an improved method of and instrument for measuring the intensity of light.

One object of the present invention is to provide a simple, rapid, and accurate method of measuring light and suitable apparatus for carrying out said method.

A further object is to provide a convenient instrument for the use of photographers, by the use of which they may accurately and quickly determine the proper amount of exposure for any condition and kind of light, and thus avoid loss of time and prevent the spoiling of plates and prints through under or over exposure.

My improved photometer will also be found of value in making "enlargements," either by natural or artificial light, also "blue prints" and other solar prints, and in all cases wherein it is desired to determine the intensity of actinic or other light.

In the accompanying drawings, in which like reference-signs refer to like parts throughout the several views, Figure 1 is a perspective view of my improved photometer and actinometer. Fig. 2 is a plan view, the cover being open and parts of the partitions broken away. Fig. 3 is a vertical sectional view. Fig. 4 is a section on the line $x$ $x$ of Fig. 3, showing the valve; and Fig. 5 is a similar section showing another form of valve.

In the drawings, A indicates the casing or frame within which the various parts of the instrument are inclosed. It is preferably made with a hinged or removable cover, so that the interior may be easily reached.

The casing A is divided into three light-tight compartments $a$, $b$, and $c$. Between the compartments $a$ and $b$ is an opening D, through which light may pass from a lamp or light L in the chamber $a$ to the chamber $b$. In order to diffuse the rays from the lamp, a sheet of paper, ground glass, or other translucent material $d$ is placed over the opening D.

I provide means for varying the amount of light which passes through the opening D. Thus in Figs. 3 and 4 I have shown a valve E, composed of two sliding plates $e$, which are adjustable toward and from each other by means of a right and left hand screw $e'$, which passes through lugs in the lower parts of the plates. A guide-rod $e^2$, passing through lugs in the upper part of the plates may be used to steady their motion and keep them parallel. An opening F in the outer casing admits the light to be tested. This opening may be provided with a lens or plain glass, if desired, and is covered with a translucent material $f$, for diffusing the rays of light. The openings D and F and the lamp or light are located in a straight line with each other.

Between the openings D and F, I place a device for indicating when two lights are of equal intensity. Several such devices are well known to those skilled in the art to which my invention belongs. For instance, the partition between the compartments $b$ and $c$ may be provided with an opening G in line with the openings D and F. Over the opening G is stretched a piece of bibulous paper or other equivalent material $g$, having a grease-spot $g'$ of spermaceti or similar substance in its center. It is well known that if a paper thus prepared be illuminated by a light placed in front the spot appears darker than the surrounding space. If on the contrary it be illuminated from behind, the spot appears lighter than the surrounding space. If now light to be tested or measured be admitted through the opening F and a fixed light L of known intensity be placed in the chamber $a$ back of the opening D, then by adjusting the plates $e$ of the valve E until the portion of light passing through the valve E equals the light passing through F, we may judge of the intensity of the light passing through F by observing the degree of opening of the valve E.

In order to readily ascertain the amount of light passing through the valve E, I connect to said valve an indicator I, having a pointer $i$ and dial $i^2$. As shown, the pointer is fixed directly upon the end of the right and left hand screw-shaft $e'$; but it may be connected to the valve in any other suitable manner.

The dial $i^2$ may be constructed to indicate different results, according to the use to which the instrument is to be put. For instance, if it is to be used to indicate the amount of exposure which a certain quality of photographic plates require, it may be graduated so as to indicate the number of seconds or the fractions of a second of exposure which should be given, depending upon the intensity of the light coming through the opening F.

It will be understood that I may use any suitable graduations upon the dial depending upon the particular variety of work to which the instrument is applied.

The valve E may be adjusted in various ways. In Figs. 2, 3, and 4 I have shown it as adjusted by a right and left hand screw-shaft. Upon this shaft is a large sprocket-wheel $k$, which is connected by a sprocket-chain $k'$ to a smaller wheel $k^2$ upon a shaft which is conveniently located to be turned by a button $k^3$. By this arrangement I am enabled to give the valve a slow and steady movement and to locate the button $k^3$ where it can be most conveniently reached.

In Fig. 5 I have shown a modified form of valve, indicator, and intermediate connections. The valve in Fig. 5 consists in a plate $m$, which slides vertically in guides $m'$ and is provided with rack-teeth $m^2$ upon either edge. In the center of the plate is a triangular opening, the upper and wider portion of which is opposite the opening D when the plate is in its lowest position. The plate is moved upward by means of pinions $n$ upon a shaft $n'$, and to the outer end of this shaft is attached the pointer $i$ of the indicator. This pointer carries a small knob $i^3$, which may be grasped by the hand to close the valve.

A suitable brake or clamp may be applied to the shaft $n'$ to hold the valve in any desired position until the indicator can be observed. For instance, a wheel $o$ may be placed upon the shaft and a spring-brake $o'$ arranged to bear upon the wheel $o$ with sufficient tension to prevent the shaft from turning, except when the handle $i^3$ is turned.

As a convenient means of observing the grease-spot $g$ I place a mirror $s$ in an angular position at the bottom of the chamber $c$, so as to reflect the image of the spot to an eye-piece Q at the end of the casing opposite the opening F.

My invention is designed principally to use in connection with photographic cameras, and to this end it may be made of convenient size to insert into the camera, so that all the light which enters through the lens of the camera may pass directly into the photometer and the amount of exposure necessary be indicated upon the dial, or, if desired, that the amount of light of any particular object as reflected or thrown on the ground focusing-glass may be measured. It will be obvious, however, that the photometer may be placed upon a separate stand and the test made by directing it so as to receive the same light which passes to the camera—that is, the light reflected from the object to be photographed, or that passes through the enlarging lens in case of enlargements.

While I do not intend to confine myself to any particular form of standard light, I have found in practice that an electric lamp gives much more satisfactory results than any other light-producer, especially when such lamp is provided with a platinum filament, which will not waste away, as do the ordinary filaments of carbon.

When the photometer is to be used in a photographic gallery, it may be connected with the ordinary electric-light system of the town or to a battery. For outdoor work I connect the lamp with an electric accumulator or storage-battery Z, which forms a part of the outfit.

My invention may be adapted for use as an actinometer by interposing between the opening F and the device G material which will cut off all but the actinic rays of light—such, for instance, as a plate of blue glass, (shown in dotted lines at R in Fig. 3.) The indicator in such case will show the intensity of the actinic rays entering the opening F, as compared with the light from L.

It will be obvious that many forms of apparatus may be constructed in accordance with the principle of my invention without departing from the spirit thereof, and therefore, without limiting myself to the precise construction shown,

I claim—

1. The method of measuring the intensity of light, which consists in cutting off more or less of the rays from a standard light until the remainder equals the light to be measured and then noting the proportion of standard light cut off, substantially as described.

2. The method of measuring the intensity of the actinic rays in light, which consists in passing the rays of light to be measured through a substance which permits actinic rays only to pass, then cutting off more or less of the rays of a standard light until the remainder equals the light to be measured, and then noting the proportion of standard light cut off, substantially as described.

3. In an instrument for measuring the intensity of light, the combination, with a device for indicating when two lights are of equal intensity, of a standard light fixed relatively to said device, means for cutting off any desired amount of the rays of said light, and an indicator, substantially as described.

4. In an instrument for measuring the intensity of light, the combination, with a diaphragm and grease-spot thereon, of a standard light at a fixed distance from said diaphragm, and a valve between the light and diaphragm for cutting off portions of light, substantially as described.

5. The combination, in a photometer, with a device for indicating when two lights are of equal intensity, of an electric lamp having a platinum filament, said lamp being fixed in relation to said device, and a valve interposed between said lamp and device, substantially as described.

6. The combination, in a photometer, with a device for indicating when two lights are of equal intensity, of an electric lamp fixed in relation to said device, a storage-battery, and a valve for varying the amount of light permitted to pass from the lamp to said device, substantially as described.

7. The box or casing having the chambers $a$, $b$, and $c$, the lamp L in chamber $a$, the fixed valve between $a$ and $b$, the device G between $b$ and $c$, and the opening F to admit light to the chamber $c$, substantially as described.

8. The combination, with the chamber $b$ and $c$ and the intermediate device G, of the opening F, opening D, fixed light, and valve consisting of plates $e$ $e$ and double screw $e'$, substantially as described.

9. The combination, with the fixed light and device G, of a valve for variably cutting off the light from the device, and an indicator connected to the valve, substantially as described.

10. The combination, with the casing having the compartments $a$, $b$, and $c$, of the device G, the lamp, the openings D and F for admitting light to opposite sides of the device G, the fixed valve E for regulating the light from the lamp, the mirror S, and the eyepiece Q, substantially as described.

11. The combination, with chambers $b$ and $c$ and the device G, located in the partition separating said chambers, of the openings D and F, light L, valve E, and the translucent material covering the openings D and F for diffusing the light, substantially as described.

12. The combination, with the chambers $b$ and $c$, having openings D and F, valve E, and the device G, located between said openings, of a light L, opposite the opening D, and means for cutting off all but the actinic rays of light at the opening F, substantially as described, and for the purpose set forth.

In testimony whereof I affix my signature in presence of two witnesses.

LOUIS H. BARKER.

Witnesses:
J. A. WILLIAMS,
E. E. RENNIGER.